UNITED STATES PATENT OFFICE.

GEORGE CRAIG, OF GLASGOW, SCOTLAND.

METHOD OF PURIFYING ALKALINE CYANIDS.

SPECIFICATION forming part of Letters Patent No. 684,914, dated October 22, 1901.

Application filed July 15, 1901. Serial No. 68,409. (No specimens.)

*To all whom it may concern:*

Be it known that I, GEORGE CRAIG, chemist, a subject of the King of Great Britain and Ireland, residing at 9 Hampden Terrace, in the city of Glasgow, Scotland, have invented certain new and useful Improvements in or Connected with the Production or Purification of Alkaline Cyanids; and I do hereby declare the following to be a full, clear, and exact description of the invention, such as will enable others skilled in the art to which it appertains to make and use the same.

The object of this invention is to effect the separation of alkaline sulfids and also, if desired, of alkaline carbonates from alkaline cyanids in the manufacture or purification of alkaline cyanids—for example, in the production of alkaline cyanids from crude materials containing cyanogen—by treatment with liquefied ammonia, if such materials have not been subjected to a preliminary treatment which will on subsequent extraction with liquefied ammonia produce cyanid free from such impurity, or if such preliminarily-treated material has become damp and soluble sulfid has formed, or if from other causes the ammoniacal extracts therefrom are found to be contaminated with sulfids or with sulfids and carbonates. According to this invention the alkaline cyanid solution contaminated with such impurities is treated with an agent or with agents which by double decomposition will separate the alkaline sulfids and also, if desired, the alkaline carbonates therefrom. The agent or agents for effecting the separation must be insoluble or practically insoluble in the menstruum and form compounds with the sulfur which are insoluble in the ammoniacal solution and react with the carbonates, if it be desired to deal with these also. Suitable agents are the precipitated oxid of lead, the insoluble chlorid of lead, the cyanids, chlorocyanids, oxycyanids, oxychlorids, and double cyanids of lead, zinc, and cadmium, and cyanids of iron, or mixtures of these, or double compounds thereof. Chlorids or cyanids of barium strontium or calcium will act to separate carbonates, but will not separate the sulfids completely.

The purifying operation can be carried out in air-tight vessels charged with the agent or agents selected and fitted with filtering appliances and with means for passing the solution therethrough. Chlorid of lead can, for instance, be used as the said agent for removing both sulfids and carbonates. Chlorid of lead with ammonia forms (with increase of bulk) an insoluble compound which presents a very large surface and may be mixed with inert matter, if desirable, to increase its porosity. The cyanids of lead do not form bulky compounds with ammonia, but react instantly with sulfid, removing it completely.

The ammoniacal solution of impure cyanids is by passing through the purifier or filter charged with chlorid of lead or with one or more of the other agents hereinbefore indicated, completely freed from sulfids or from sulfids and carbonates, and on subsequent evaporation yields an alkaline cyanid free from sulfur and from carbonates, also if the agents be selected to react also with the carbonates, as is the case with chlorid of lead.

When the purifying material is saturated with sulfids or sulfids and carbonates, a freshly-charged purifier may be put into action and the foul charge from the previous operation be washed with liquefied ammonia until freed from cyanid and the ammonia be then expelled and recovered, the foul charge withdrawn, and the purifier recharged with fresh material.

The foul material, consisting of sulfid of lead or of sulfid and carbonate of lead (in the example given) can be treated to reconvert it into chlorid of lead for reuse, which can be done by means of hydrochloric acid.

Having now particularly described and ascertained the nature of this invention and in what manner the same is to be performed, I declare that what I claim is—

1. The separation by double decomposition of alkaline sulfids, and carbonates, from ammoniacal solutions of alkaline cyanids, by subjecting them to the action of an agent, insoluble in the menstruum and capable of forming compounds with the sulfur, which compounds are insoluble in the ammoniacal solution, and of reacting with the carbonates, substantially as hereinbefore described.

2. The separation by double decomposition of alkaline sulfids from ammoniacal solutions of alkaline cyanids by subjecting them to the action of an agent insoluble in the menstruum and capable of forming, with the sulfur, compounds which are insoluble in the ammoniacal solution, substantially as hereinbefore described.

3. The process of separating impurities from ammoniacal solutions of alkaline cyanids by subjecting said solutions to the action of chlorid of lead, substantially as described.

4. The process of purifying ammoniacal solutions of alkaline cyanids by passing the same through a specified lead salt insoluble in the menstruum, and forming, with the sulfur, compounds insoluble in the ammoniacal solution, washing out the fouled agent with liquefied ammonia, expelling and recovering the ammonia, and reconverting the agent, as set forth.

In testimony whereof I affix my signature in presence of two witnesses.

GEORGE CRAIG.

Witnesses:
  WM. C. RUSSELL,
  CHAS. W. SMITH.